March 15, 1960 F. E. WILLIAMS 2,928,975

COLOR INFORMATION PRESENTATION SYSTEM

Filed Aug. 16, 1956

2 Sheets-Sheet 1

Inventor:
Ferd E. Williams,
by Paul A. Frank
His Attorney.

March 15, 1960 F. E. WILLIAMS 2,928,975

COLOR INFORMATION PRESENTATION SYSTEM

Filed Aug. 16, 1956 2 Sheets-Sheet 2

Inventor:
Ferd E. Williams,
by Paul A. Frank
His Attorney.

United States Patent Office 2,928,975

Patented Mar. 15, 1960

2,928,975

COLOR INFORMATION PRESENTATION SYSTEM

Ferd E. Williams, Scotia, N.Y., assignor to General Electric Company, a corporation of New York Application August 16, 1956, Serial No. 604,423

8 Claims. (Cl. 313—108)

Figures 1, 3, 3A, 3B:
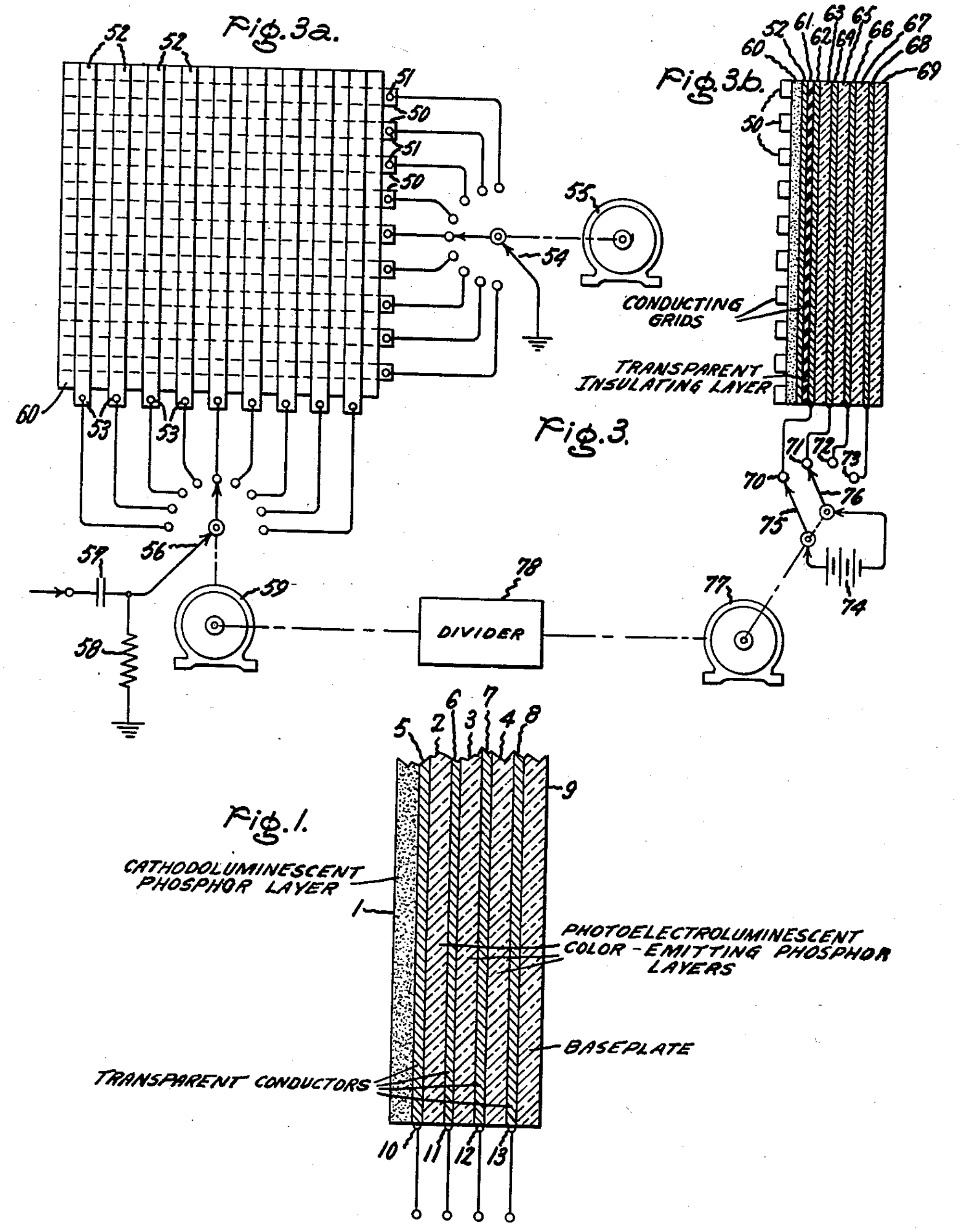

The present invention relates to improved information portraying systems and screens therefor. More particularly, the invention relates to information portraying systems and screens therefor uniquely adapted to present high brightness information when supplied with low intensity signals.

In the television arts, particularly in the art of color television, presently available information presentation systems contain complicated and expensive components for obtaining high brightness images. Thus, for example, it has been found that in order to obtain television images of sufficient brightness and definition, high potentials ranging up to 15000 and 20000 volts must be utilized for the acceleration of an electron beam which excites a television picture tube screen to luminescence. These high voltages require complicated circuits for their production, and are inherently dangerous. A further appreciation of the complexity of present television presenation systems and screens may be gained from a consideration of the fact that present color television picture tubes of the line sequential type require phosphor screens having 500 parallel lines of each of the three primary color emitting phosphors used, or a total of 1500 phosphor lines upon the face plate of each tube. Television presentation tubes of the dot sequential type require a phosphor screen having approximately three-quarter million phosphor dots and a mask, interposed between the screen and the source of electrons, which has approximately one-quarter million holes therein. Obviously, the preparation of such tubes is a highly complicated and expensive operation.

Similar problems are also present in radar presentation systems. Radar presentation systems, in general, require extremely high voltage for the production of intelligible visual signals. Additionally, the intensity of images obtainable from present day radar presentation systems is much lower than that obtainable in television systems. Furthermore, no practical system has yet been developed for the presentation of radar images in color to permit a greater amount of intelligence to be transmitted.

Accordingly, one object of this invention is to provide color television and radar presentation systems which are operable to produce high brightness images utilizing low voltage excitation.

Still another object of the invention is to provide color television and radar presentation systems and screens therefor adapted to produce color images utilizing photoelectroluminescent phosphor films.

Briefly stated, in accord with one embodiment of the invention I provide a color image presentation system having a presentation screen assembly including a first phosphor screen, stimulable to emit blue or ultra-violet radiation by the excitation of cathode rays or the application of an electric field thereto. In close proximity to, and subjected to the emission of the first mentioned phosphor screen, I provide a second screen having three different films of photoelectroluminescent, light-amplifying phosphors, each of which is responsive to the emission of the first phosphor screen and each of which emits light of a different color. Means are provided to apply an electric field to each of the light amplifying phosphor layers in synchronism with the presentation of the image upon the first phosphor layer in frame, line or dot sequence. The information impressed upon the light amplifying phosphor films is translated thereby into a color image presentation of high brightness which is ideally adapted to color television and color radar applications.

Since the energy which is responsible for the production of high brightness images in the systems of the invention comes from the electric field impressed upon the light amplifying phosphor rather than the source of the information impressed thereupon, high brightness images are attained without the necessity of utilizing the objectionably high potentials necessary in present day color television and radar presentation systems.

The novel features believed characteristic of the invention are set forth in the appended claims. The invention itself, together with further objects and advantages thereof, may best be understood with reference to the following detailed description taken in conjunction with the attached drawings in which;

Figure 1 is a vertical cross sectional view of a color presentation and intensifying screen constructed in accord with one embodiment of the invention.

Figures 2A, 2B:
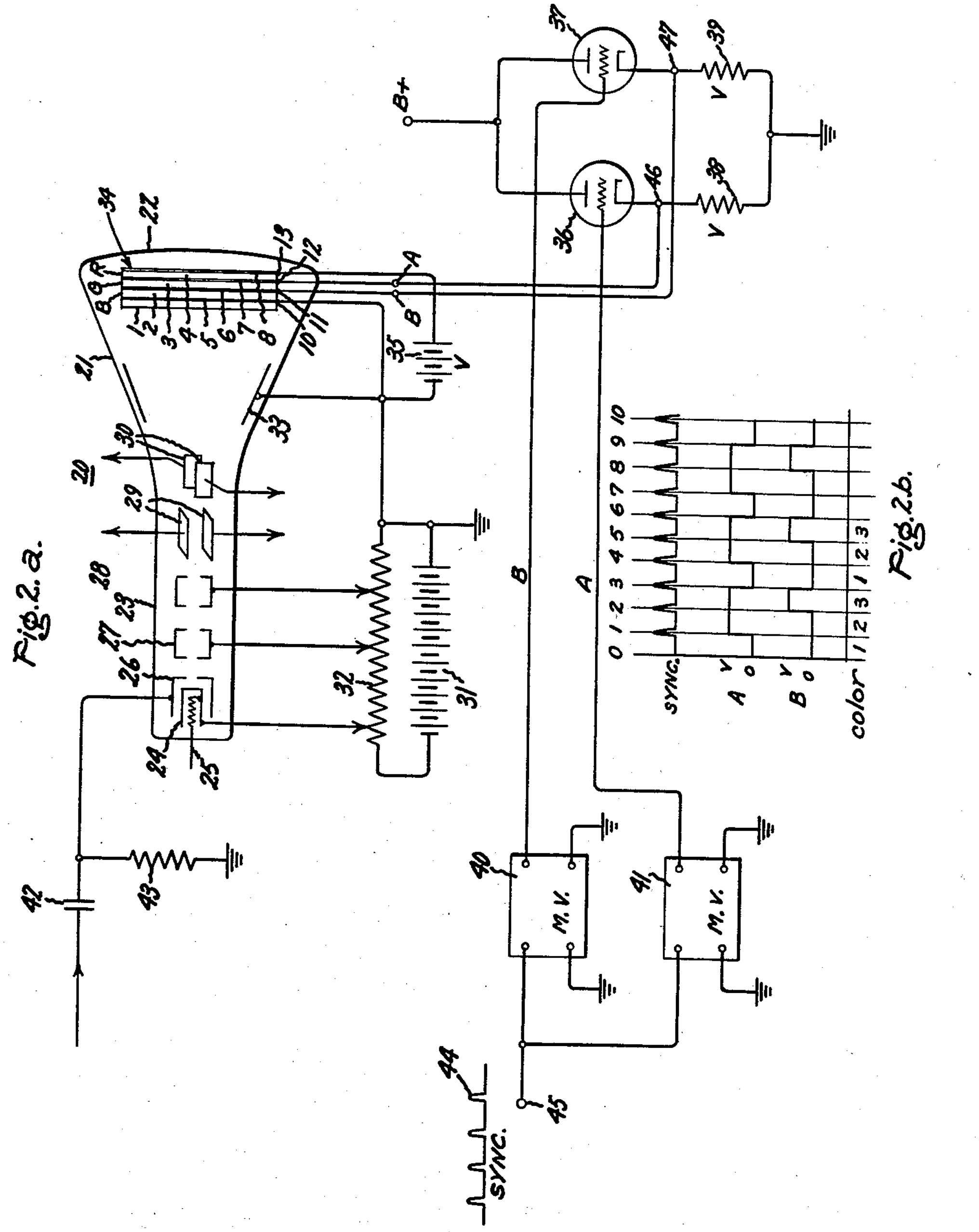

Figure 2*a* is a schematic diagram of a color television picture tube including the screen of Figure 1 and switching circuits therefor.

Figure 2*b* is a graphical representation of voltage wave forms at the input and output terminals of the multivibrator stages of Figure 2*a*, and, Figure 3 represents schematically an alternative embodiment of the invention in which the image presentation system of the invention includes a crossed-grid type phosphor screen.

Figure 1 of the drawing illustrates a color television presentation screen constructed in accord with one aspect of the invention and adapted to be utilized as the faceplate of a color television cathode ray tube. The image presentation screen of Figure 1 comprises a layer 1 of a phosphor which emits blue or ultra-violet light when excited by cathode rays. Phosphor layer 1 is positioned in close relationship with three light amplifying phosphor films 2, 3 and 4, each of which is sensitive to the emission of layer 1 and each of which emits a different color emission when excited by the emission of layer 1. Film 2 is disposed in plane parallel relation between transparent conducting films 5 and 6. Film 3 is disposed in parallel relationship between transparent conducting films 6 and 7 and film 4 is disposed in plane parallel relationship between transparent conducting films 7 and 8.

The composite screen is mounted or deposited upon a transparent insulating base plate 9 which may be the face plate of a cathode ray tube, or which may be disposed in close proximity thereto.

Cathodoluminescent phosphor layer 1 may be any of the many suitable cathodoluminescent phosphors which, when excited by cathode rays, emit light in the blue region of the visible spectrum, or in the ultra-violet. For the purposes of this specification this range is meant to extend from approximately 3200 to 4600 A.U. Layer 1 may, for example, be composed of aluminum oxide crystals and a suitable binder in a material such as potassium silicate, or a zinc sulfide phosphor activated with approximately 0.05% by weight of silver, similarly bound.

Films 2, 3 and 4, each possess the property of emitting a characteristic color visible light when irradiated by the emission of layer 1. Additionally, the brightness of the emission of layers 2, 3 and 4 is of much greater intensity than that of the stimulating radiation when these films are simultaneously irradiated and subjected to a unidirectional electric field. In other words, films 2, 3 and 4 may be any three different-color emitting phosphors which possess the property of photoelectroluminescence. The phenomenon of photoelectroluminescence is described in detail in my article "Electroluminescence and Light Amplifying Phosphors Applied to Fluoroscopic Image Intensification," published in the January 1956 issue of the "American Journal of Roentgenology, Radium Therapy, and Nuclear Medicine," vol. LXXV No. 1, page 77. Briefly stated, photoelectroluminescence is the property of certain continuous homogeneous phosphor films which results in the emission of intensified visible light images when the film is simultaneously excited by incident radiant energy and by the excitation of an impressed unidirectional field. Photoelectroluminescent films per se are disclosed and claimed in Cusano application 665,707, filed June 14, 1957 which is a continuation-in-part of Cusano application 616,493, filed October 17, 1956, now abandoned, which is a continuation-in-part of Cusano application 451,355, filed August 23, 1954, now abandoned.

Although any combination of three different primary or basic-color-emitting photoelectroluminescent phosphors may be utilized for films 2, 3 and 4, film 2 may, for example, be chosen to emit yellow emission and may comprise zinc sulfide activated with 0.1 to 1 mole and preferably 0.5 mole percent of manganese and chlorine. Film 3 may, for example, be chosen to emit red emission and may comprise zinc sulfide activated with 0.1 to 1 mole percent and preferably 0.5 mole percent iron and chlorine. Film 4 may, for example, be chosen to emit blue emission and may comprise zinc sulfide activated with 0.1 to 1 mole percent and preferably 0.5 mole percent of cerium and chlorine. These specific phosphors are given by way of example, rather than in a limiting sense, and it will be appreciated that any of a number of suitable photoelectroluminescent phosphor films, chosen to emit appropriate different colors, may be utilized as films 2, 3 and 4 respectively.

Transparent conducting films 5, 6 7 and 8 may be thin transparent evaporated films a fraction of a micron thick, of a metal such as aluminum or silver or a metal mesh or grid of high transparency. Alternatively, these layers may be films of tin oxide several microns in thickness known in the art as "conducting glass." Preferably, however, these films comprise similarly thin films of titanium dioxide, which may be produced in accord with the process described and claimed in Patent No. 2,732,313 to Cusano and Studer. In accord with the teachings of this patent, a thin film of titanium dioxide from 0.1 to 10 microns thick may be formed upon a suitable substrate by causing titanium tetrachloride and water vapor to be intermixed in the vicinity of a heated substrate. As deposited, the titanium dioxide film is not conducting, but may be rendered conducting by the subsequent deposition of a transparent photoelectroluminescent light amplifying phosphor film thereupon. Alternatively, the titanium dioxide layer may be rendered conducting in accord with the process described and claimed in Patent No. 2,717,844 to L. R. Koller.

Different color-emitting, light amplifying phosphor films 2, 3 and 4, as mentioned hereinbefore, may comprise any appropriate three different color-emitting light amplifying or photoelectroluminescent phosphors. These films may be formed in accord with the teachings of U.S. Patent No. 2,675,331 to Cusano and Studer. In accord with this method, the base plate upon which the film is deposited is maintained at a temperature of approximately 500 to 650° C. and contacted by intermingled vapors of a gas containing the phosphor anion and vapors of the phosphor cation and the activator. These films may be deposited directly upon a glass substrate or, as in this case, upon a transparent conducting film which may be formed directly upon the substrate or upon a previously deposited phosphor film. The films as deposited, may have any desired thickness, as for example, from 1 to 100 microns, depending upon the length of time the process is carried out. Preferably, however, the films are each approximately 10 microns thick. They are transparent, crystalline and continuous and contain no granular particles which may scatter light or create halation, and are of uniform thickness. It has been found that the above-described transparent, continuous, vapor-deposited phosphor films, when simultaneously subjected to blue or ultra-violet radiation and to a unidirectional electric field emit visible light in accord with the characteristics and proportions of the components thereof. This light is of a much greater intensity than the incident radiation and, for this reason, these films are denominated herein as light amplifying phosphor films. In order that these films exhibit photoelectroluminescence it is necessary that the electrodes which impress the electric field thereupon be in actual electrical contact with the phosphor itself. For this reason the phosphor may not be suspended in a dielectric.

The screen of Figure 1 may be formed by first suspending an insulating base plate 9 which is transparent to visible light and which may, for instance, be of glass, mica or quartz, and depositing thereupon transparent conducting titanium dioxide film 8 by the process described and claimed in the aforementioned Cusano and Studer Patent No. 2,732,313. Light amplifying phosphor film 4 is next deposited upon transparent film 8 by the process of the aforementioned Cusano and Studer Patent No. 2,675,331. The steps of deposition of transparent conducting films and light amplifying phosphor films are alternately repeated; in turn successively depositing layers 7, 3, 6, 2 and 5. Cathodoluminescent phosphor layer 1 is then deposited upon transparent conducting electrode 5 by conventional spraying or liquid settling techniques, well known to the art, or by the vapor deposition process of Cusano and Studer Patent No. 2,732,313.

The composite screen, as illustrated in Figure 1, may then be incorporated as the face plate of a cathode ray tube, appropriate connections 10, 11, 12 and 13 being made to transparent conducting electrodes 5, 6, 7 and 8, respectively. Alternatively, after these connections have been made, the entire assembly may be mounted in close relationship to the face plate of a cathode ray television or radar projection tube. Although, In Figure 1, the screen has been illustrated as being flat, it is obvious that the screen may be made with any appropriate curvature, as is conventional in the manufacture of such projection tubes.

Figure 2*a* illustrates, in schematic, a television cathode ray tube including the screen of Figure 1, and appropriate circuits for the operation thereof. In Figure 2*a*, cathode ray tube 20 includes a conical portion 21 having a face plate 22 and a neck portion 23. Within neck portion 23 are located a cathode 24, a heater 25, a control electrode 26, and accelerating electrodes 27 and 28. Immediately following the accelerating electrodes are a pair of vertical electrostatic deflection plates 29 and a pair of horizontal electrostatic deflection plates 30. Alternatively, rather than electrostatic deflection plates 29 and 30, electromagnetic deflection yokes may be utilized, since the characteristics of the electron gun of tube 20 are not critical.

Operating potentials for the operation of tube 20 are supplied by a unidirectional voltage source represented generally by battery 31 shunted with a voltage dividing resistor 32. Appropriate taps for the cathode and accelerating electrodes of tube 20 are made to voltage dividing resistor 32 to supply the operating potentials thereto. The total voltage of source 31 is supplied to accelerating ring 33 and to terminal 10 of color television screen 34 and therethrough to conducting electrode 5 which serves as the anode of the cathode ray tube. While the potentials applied to the electron gun electrodes are the same as those applied to conventional electron guns, the accelerating potential applied to ring 33 may be as low as 500 volts as compared with the 20,000 volts often used in conventional cathode ray tubes. This potential may be so low because, in the systems of the invention, the electron beam transmits information to the viewing screen, but does not apply the energy necessary to stimulate the screen to luminescence. This energy is supplied by the unidirectional electric field applied to the screen.

A unidirectional voltage source represented generally by battery 35 is used to supply a unidirectional potential V to electrodes 10, 11, 12 and 13 sequentially in order to cause one of different color emitting light amplifying phosphor films 2, 3 and 4 to be energized in accord with the presentation of color information to control electrode 26 of tube 20. One terminal of battery 35 is connected to terminal 10 and the other terminal thereof is connected to terminal 13. This voltage may conveniently be the order of from 10 to 100 volts and is switched so as to apply an electric field across one only of the three light amplifying phosphor films. Switching is accomplished by cathode follower tubes 36 and 37 having respectively cathode resistors 38 and 39 which tubes are, in turn, controlled by multivibrators 40 and 41.

In the operation of the switching circuit, the input signal carrying the information to be portrayed visually by cathode ray tube 20 is applied to capacitor 42 and is developed across resistor 43. This signal is accompanied with a synchronizing pulse, represented at 44, which is supplied to terminal 45, a common input terminal to multivibrators 40 and 41, the other input terminal of each being grounded. Multivibrators 40 and 41 may be conventional free-running, synchronized multivibrators, such as those described on page 512 et seq. of Terman's "Radio Engineers Handbook" published 1943 by McGraw Hill Company. The constants of the multivibrators are adjusted so that multivibrator 41, normally off, is triggered to the on condition by the first synchronizing pulse and off by the third synchronizing pulse. It is again triggered on by the fourth synchronizing pulse and off by the sixth as represented by curve A of Figure 2*b* of the drawing. The constants of multivibrator 40 are adjusted so that the multivibrator, normally off, is switched on by the second synchronizing pulse, off by the third, on by the fifth, and off by the sixth, as represented by curve B of Figure 2*b* of the drawing.

Cathode follower electron discharge devices 36 and 37 and the cathode resistors therefor, respectively 38 and 39, are so selected as to develop a voltage, when conducting between ground and output terminals 46 and 47 thereof, equal to V, the voltage developed by battery 35. Cathode follower 36 is adapted to be rendered conducting, and thus to produce a voltage V across cathode resistor 38, when multivibrator 41 is in the on condition. Likewise, cathode follower 37 is adapted to be maintained conducting and to thus develop a potential V across cathode resistor 39 when multivibrator 40 is in the conducting condition.

In the time interval elapsing between zero time and the arrival of the first synchronizing pulse to multivibrators 40 and 41 the potential V of battery 35 is applied between terminals 13 to which it is connected and 12 which is maintained at ground potential through cathode resistor 38 of multivibrator 36, since resistor 38 is of much lower resistance than the resistance of phosphor screens 2 and 3. The entire potential V is thus impressed across light amplifying phosphor 4, and, when cathodoluminescent phosphor layer 1 is irradiated by cathode rays so as to emit blue or ultra-violet light, a first color is emitted from the composite screen. Upon the arrival of the first synchronizing pulse, as is indicated in Figure 2*b*, multivibrator 41 is triggered to the on condition, and consequently, electron discharge device 36 is rendered conducting. A voltage V is developed across cathode resistor 38 and is applied to terminal 12. Since the voltage V is also applied to terminal 13 by battery 35, no electric field is developed through light amplifying phosphor film 4 and the emission thereof is extinguished. However, with terminal 11, and consequently transparent conducting film 6, maintained at ground potential through cathode resistor 39 of cathode follower 37, the voltage V is impressed across light amplifying phosphor film 3. Thus, when cathodoluminescent phosphor 1 is excited by cathode rays and emits blue or ultra-violet light, a second color radiation of a high intensity is emitted by light amplifying phosphor film 3. Upon the arrival of the third synchronizing pulse, as is illustrated in Figure 2*b*, no change occurs in the condition of multivibrator 41. However, multivibrator 42 is then triggered to the on condition, rendering electron discharge device 37 conducting, and causing a voltage V to be developed across cathode resistor 39 thereof. Thus, the potential V is applied to transparent conducting film 6 through terminal 11. Since the voltage V is now applied to conducting films 6, 7 and 8, no electric field is developed across light amplifying phosphor films 3 and 4 and the first and second color emission thereof is effectively quenched. However, since the potential V is impressed across light amplifying phosphor film 2 through terminals 10 and 11, a third color emission is emitted therefrom, when cathodoluminescent phosphor film 1 emits blue or ultra-violet light.

In accord with the foregoing description it may be seen that the information portraying screen of the invention is so arranged that three light amplifying phosphor films are juxtaposed in close relationship with the blue or ultra-violet emitting cathodoluminescent layer of the screen. Each of the light amplifying layers emits a different color when irradiated by the emission of the cathodoluminescent layer and when a direct unidirectional electric field is simultaneously impressed thereupon. The unidirectional field is impressed upon each of the light amplifying phosphor films in synchronism with the application of the corresponding color information signal to the control electrode of the cathode ray tube. Thus, when the signal containing the first color information is impressed upon the control electrode of the cathode ray tube and transmitted to the electron beam generated therein, the light amplifying screen which emits the first color has a unidirectional field impressed thereupon, and no field is impressed upon the other two light amplifying films. Conversely, when the second color or third color signal is received on the control electrode of the cathode ray tube, either the first color emitting or the second color emitting film, respectively and exclusively, has a unidirectional electric field impressed thereupon.

In this embodiment of the invention the actual energy which causes high brightness light emission from the screen of the invention comes from the unidirectional field impressed upon the light amplifying phosphor films. The electron beam generated within the cathode ray tube need only have sufficient energy to transmit information to cathodoluminescent phosphor layer 1. Thus the system of the invention is operative to produce high brightness images with cathode ray accelerating voltages of as low as 500 volts as opposed to the 15,000 to 20,000 volts utilized in conventional systems. In a typical system accelerating voltages from 500 to 1000 volts may be used. Although the information portraying screen of the invention is ideally suited for application with a frame sequential television presentation system, it is also well adapted for line or dot sequential presentation systems. Additionally, although the invention is described with reference to a three primary component color system, it is apparent that with properly chosen phosphors, the invention may be utilized in a two component color presentation system.

In accord with a further embodiment of the invention, the light amplifying phosphor films of the invention may be incorporated with a cross-grid image presentation system to secure a high brightness color information portrayal therefrom. A crossed-grid type information portraying screen is described and claimed in U.S. Patent No. 2,698,915 to W. W. Piper. The incorporation of such an information portrayal system in accord with the invention is illustrated in Figure 3 of the drawing.

In Figure 3, the crossed-grid arrangement is shown in plan view and also in vertical cross section, the plan view being presented in Figure 3*a* and the vertical cross section in Figure 3*b*. In Figure 3*a* a first set of horizontal electrode members 50, each having a terminal connection 51 thereto, are disposed on one side of a layer 60 of phosphor which emits blue or ultra-violet light when excited by an electric field. A second set of vertical, parallel grid-like electrode members 52 are disposed on the opposite surface of the electroluminescent phosphor layer. The grids are arranged so that the members of one grid are substantially perpendicular to the members of the other grid. A first switch means 54 is adapted to alternately connect one of the horizontal grid terminals to ground potential and is driven by a source of energy conventionally represented as electric motor 55. A second switch means 56 is connected to alternately connect an input signal, impressed through condenser 57 across resistor 58, to vertical electrode members 52 by means of vertical electrode terminals 53. Second switch means 56 is driven by a source of power conventionally represented as motor 59. Both motors 55 and 59 and switch means 54 and 56 may be replaced by any functionally equivalent electronic circuitry such as, for instance, delay lines, binary counting units or a system wherein switch terminals 53 and 51 are scanned by respective electron beams which form electrically conducting paths to connect terminals 51 to ground potential and terminals 53 to the input signal.

In Figure 3*b* the composite information portrayal screen is represented in vertical cross section. Horizontal electrode members 50 are juxtaposed on one side of electroluminescent phosphor layer 60 which may, for example, be either a matrix of single crystals, or a vapor-deposited phosphor prepared in accord with U.S. Patent 2,675,331 to Cusano and Studer. This phosphor may be any electroluminescent phosphor which emits blue or ultra-violet light and may conveniently be zinc sulfide activated with 0.01% by weight of copper, prepared by firing in an atmosphere of hydrogen sulfide and hydrogen chloride. Vertical electrode elements 52 contact the opposite major surface of phosphor layer 60. Immediately adjacent vertical electrode members 52 is a thin insulating, light transparent film 61 which may for example be unreduced titanium dioxide. Next to insulating film 61 is a transparent conducting layer 62 which may be any of the transparent conducting layers described with respect to the embodiment of Figure 1 of the invention. Immediately next to transparent conducting electrode 62 there are located, in succession, a first light amplifying phosphor film 63, a second transparent conducting electrode 64, a second light amplifying phosphor film 65, a third transparent conducting electrode 66, a third light amplifying phosphor film 67, and a fourth transparent conducting electrode 68. The entire composite screen may conveniently be mounted upon an insulating, light transparent base plate 69. The base plate may, however, be located on the opposite surface, adjacent electrodes 50. Terminals 70, 71, 72 and 73 are connected to transparent conducting electrodes 62, 64, 66 and 68 respectively. Light amplifying phosphor layers 63, 65 and 67 may be any of the suitable different color emitting light amplifying phosphor films and of the same dimensions as described with respect to the first-discussed embodiment of the invention.

A source of unidirectional electric potential supplying a potential of from 10 to 100 volts and represented generally as battery 74 is connected between switch contact members 75 and 76 which are rotated mechanically or electronically, as with the switching system described with respect to Figure 2, by a source of switching energy represented conventionally as electric motor 77. The speed of electric motor 77 is synchronized with, and reduced from, the speed of electric motor 59 by a conventional electronic divider circuit 78 which steps the frequency of switching of switch member 75 and 76 down from the frequency of switching of switch member 56 by the proper ratio depending upon whether the presentation is presented in a frame, line or dot sequential system. Since such dividing circuits are conventional and well known in the art, divider 78 is shown in block form.

The screen of Figure 3*b* may be prepared in accord with the teachings hereinbefore noted for the preparation of the individual layers. Thus, for example, in preparing such a screen one may start with a base plate 69, transparent to visible light such as, for instance, glass, quartz, or mica, and initially deposit thereupon transparent conducting electrode 68 of titanium dioxide in accord with the teachings of U.S. Patent 2,732,313 to Cusano and Studer. Next a vapor deposited light amplifying phosphor film 68 is deposited thereupon by the method described and claimed in U.S. Patent 2,675,331 to Cusano and Studer. The processes are alternately repeated successively depositing layers 67, 66, 65, 64, 63 and 62. A transparent insulating layer 61 as, for example, an unreduced transparent film of titanium dioxide, is then deposited upon the last mentioned conducting layer 62. A grid of parallel vertical, conducting elements 52 is then deposited upon insulating layer 61 by evaporating, painting, or spraying thin metallic lines thereupon by techniques well known to the art. A suspended powder in dielectric phosphor layer which may conveniently be zinc sulfide activated with 0.01% by weight of silver but which may alternatively be any of the well known ultra-violet or blue emitting electroluminescent phosphors is then sprayed or otherwise deposited upon the vertical electrode matrix until the desired thickness, which may be approximately 50 microns, is achieved. After the phosphor is dried, a matrix of horizontal parallel grid electrodes may then be deposited thereupon by spraying, evaporating, or painting, as is done with the matrix of the vertical electrode elements. Appropriate contacts are then made to the transparent conducting electrodes and to the vertical and horizontal grid electrodes.

The screen of this embodiment of the invention functions in accord with the teachings set forth in the aforementioned Piper Patent 2,698,915. The phosphor region at a particular intersection of horizontal and vertical grids is excited to electroluminescence when the two respective grids are switched by switch means 54 and 56 so as to form a complete circuit between input and ground. The remaining areas of the screen remain unexcited. A raster is thus scanned by the operation of switch motors 55 and 59 and, in sequence therewith, the voltage is switched on the light amplifying phosphor layers so that when a first-color signal is applied to capacitor 57 and across resistor 58 causing the excitation of a portion of crossed grid screen, a unidirectional electric potential is impressed upon the first-color emitting light amplifying phosphor screen. Likewise, when second-color and third-color signals respectively are applied to the cross-grid screen the unidirectional potential is applied across the second-color and third-color emitting light amplifying films, respectively. Thus, a three-primary-color image is emitted by the composite screen of the invention. As with the previously discussed embodiment of the invention, this embodiment may also be utilized in two component color systems by the use of two properly selected light amplifying phosphor films only.

While the invention has been described with respect to certain embodiments thereof, it is obvious that many changes and modifications will immediately occur to those skilled in the art. Accordingly, I intend, by the appended claims, to cover all such changes and modifications as fall within the true spirit and scope of the invention.

What I claim as new and desire to secure by Letters Patent of the United States is:

1. A color image presentation screen comprising, in spaced relation, a first phosphor layer comprising a luminescent phosphor which emits radiation in the region comprising the ultra-violet spectrum and the blue portion of the visible spectrum when excited by an electric field, a first matrix of parallel grid members deposited on and contacting one surface of said layer, a second matrix of parallel grid members deposited on and contacting the opposite surface of said layer substantially perpendicular to said first matrix, a plurality of continuous homogeneous transparent photoelectroluminescent light amplifying phosphor films, each of which emits a different color emission when simultaneously excited by the emission of said first phosphor layer and a unidirectional electric field, a source of unidirectional electric potential, a plurality of transparent conducting films, said conducting films and said light amplifying phosphor films disposed in contiguous alternate relation, and means sequentially applying an electric field across each of said light amplifying phosphor films in synchronism with signals applied to said grid members to cause the light amplifying film so excited to emit its characteristic radiation.

2. A color image presentation screen comprising in space relation, a first phosphor layer, said layer being composed of a luminescent material which when excited by incident cathode rays emits radiation in the region comprising the ultra-violet spectrum and the blue portion of the visible spectrum, a first transparent conducting electrode in contact with said first phosphor film, a second transparent continuous homogeneous photoelectroluminescent light amplifying phosphor film in contact with said first conducting electrode, said film emitting a first color light when simultaneously excited by the emission of said first phosphor layer and a unidirectional electric field, a second transparent conducting film contacting said second phosphor film, a third transparent continuous light amplifying phosphor film contacting said second transparent conducting film, said second phosphor film emitting a second color light when simultaneously excited by the emission of said first phosphor layer and a unidirectional electric field, a third transparent conducting film contacting said third phosphor film, a third transparent continuous phosphor film contacting said third transparent conducting film and emitting a third color light when simultaneously excited by the emission of said first phosphor layer and a unidirectional electric field, a fourth transparent conducting film contacting said fourth phosphor film, contact means to each of said transparent conducting films, and providing means sequentially applying an electric field across each of said light amplifying phosphor films in synchonism with signals applied to said first phosphor film to cause the light amplifying film so excited to emit its characteristic radiation.

3. A color image presentation screen comprising in spaced relation; a first phosphor layer, said layer being composed of a luminescent material which when excited to luminescence emits radiation in the region consisting of the ultra-violet spectrum and the blue portion of the visible spectrum; a light amplifying section contiguous to said first phosphor layer and subjected directly to the emission thereof, said light amplifying section including a plurality of transparent conducting films and a plurality of continuous homogeneous transparent photoelectroluminescent light amplifying phosphor films disposed in contiguous alternate relation, each of said light amplifying phosphor films providing a different color emission when simultaneously excited by the emission of the first phosphor layer and a unidirectional electric field; a source of unidirectional potential; and means coupling said source and said conducting films and applying an exciting electrical field across each of said light amplifying phosphor films in synchronism with an applied signal to cause the light amplifying film so excited to emit its characteristic radiation.

4. A color image presentation screen comprising in spaced relation; a first phosphor layer, said layer being composed of a luminescent material which when excited by incident cathode rays emits radiation in the region comprising the ultra-violet spectrum and the blue portion of the visible spectrum; a light amplifying section contiguous to said first phosphor layer and subjected directly to the emission thereof, said light amplifying section including a plurality a transparent conducting films and a plurality of continuous homogeneous transparent photoelectroluminescent light amplifying phosphor films disposed in contiguous alternate relation, each of said light amplifying phosphor films producing a different color emission when simultaneously excited by the emission of the first phosphor layer and a unidirectional electric field; a source of unidirectional potential, means applying a unidirectional electric field across each of said light amplifying phosphor films in synchronism with an applied signal to cause the light amplifying film so excited to emit its characteristic radiation.

5. A color image presentation system comprising a composite screen including in spaced relation; a first phosphor layer, said layer being composed of a luminescent material which when excited to luminescence emits radiation in the region consisting of the ultra-violet spectrum and the blue portion of the visible spectrum; a light amplifying section contiguous to said first phosphor layer and subjected directly to the emission thereof, said light amplifying section including a plurality of transparent conducting films and a plurality of continuous homogeneous transparent photoelectroluminescent light amplifying phosphor films disposed in contiguous alternate relation, each of said light amplifying phosphor films producing a different color emission when simultaneously excited by the emission of the first phosphor layer and a unidirectional electric field; a source of unidirectional electric potential; and switching means connecting said source and said conducting films and alternately and sequentially applying a unidirectional electric field across one of said light amplifying phosphor films to cause said one film to emit its characteristic radiation when so excited.

6. A color image presentation system comprising a composite screen including in spaced relation; a first phosphor layer, said layer being composed of a luminescent material which when excited by incident cathode rays emits radiation in the region comprising the ultra-violet spectrum and the blue portion of the visible spectrum; a light amplifying section contiguous to said first phosphor layer and subjected directly to the emission thereof, said light amplifying section including a plurality of transparent conducting films and a plurality of continuous homogeneous transparent photoelectroluminescent light amplifying phosphor films disposed in contiguous alternate relation, each of said light amplifying phosphor films producing a different color emission when simultaneously excited by the emission of the first phosphor layer and a unidirectional electric field; a source of unidirectional potential; and switching means coupling said source and said conducting films and alternately and sequentially applying a unidirectional electric field across one of said light amplifying phosphor films to cause one said film to emit its characteristic radiation when so excited.

7. A color television device comprising: a conical information presentation portion including a faceplate; a neck portion having therein means for generating focusing and deflecting an electron beam so as to form a raster pattern upon said faceplate; and an information presentation screen located adjacent to said faceplate and comprising in parallel spaced relation; a first phosphor layer, said layer being composed of a luminescent material which when excited by incident cathode rays emits radiation in the region comprising the ultra-violet spectrum and the blue portion of the visible spectrum; a light amplifying section contiguous to said first phosphor layer and subjected directly to the emission thereof, said light amplifying section including a plurality of transparent conducting films and a plurality of continuous homogeneous transparent photoelectroluminescent light amplifying phosphor films disposed in contiguous alternate relation, each of said light amplifying phosphor films producing a different color emission when simultaneously excited by the emission of the first phosphor layer and a unidirectional field; a source of unidirectional potential; and means coupled with said source and said conducting films and applying an electric field across each of said light amplifying phosphor films to cause the light amplifying film so excited to emit its characteristic radiation.

8. A color television system comprising: a cathode ray projection device having a conical information presentation portion including a faceplate; a neck-like portion having therein means for generating, focusing, and deflecting an electron beam so as to form a raster pattern upon said faceplate; and an information presentation screen located adjacent to said faceplate and comprising in parallel spaced relation; a first phosphor layer; said layer being composed of a luminescent material which when excited by incident cathode rays emits radiation in the region comprising the ultra-violet spectrum and the blue portion of the visible spectrum; a light amplifying section contiguous to said first phosphor layer and subjected directly to the emission thereof, said light amplifying section including a plurality of transparent conducting films and a plurality of continuous homogeneous transparent photoelectroluminescent light amplifying phosphor films disposed in contiguous alternate relation, each of said light amplifying phosphor films producing a different color emission when simultaneously excited by the emission of the first phosphor layer and a unidirectional field; a source of unidirectional potential; and means for alternately and sequentially connecting said source of unidirectional electric potential between adjacent transparent conducting films to impress upon one only of said light amplifying phosphor films an electric field to cause the light amplifying film so excited to emit its characteristic radiation.

References Cited in the file of this patent

UNITED STATES PATENTS

| | | |
|---|---|---|
| 2,698,915 | Piper | Jan. 4, 1955 |
| 2,728,815 | Kalfaian | Dec. 27, 1955 |
| 2,730,644 | Michlin | Jan. 10. 1956 |
| 2,780,731 | Miller | Feb. 5, 1957 |
| 2,795,730 | Fromm | June 11, 1957 |

OTHER REFERENCES

Destriau: Electroluminescence and Related Topics, Proceedings of the I.R.E., December 1955, pp. 1932–1940.

Cusano: Radiation-Controlled Electroluminescence and Light Amplification in Phosphor Films, Physical Review, vol. 98 (1955), pp. 546 and 547.